I. CORY.
Cultivators.
No. 146,576. Patented Jan. 20, 1874.
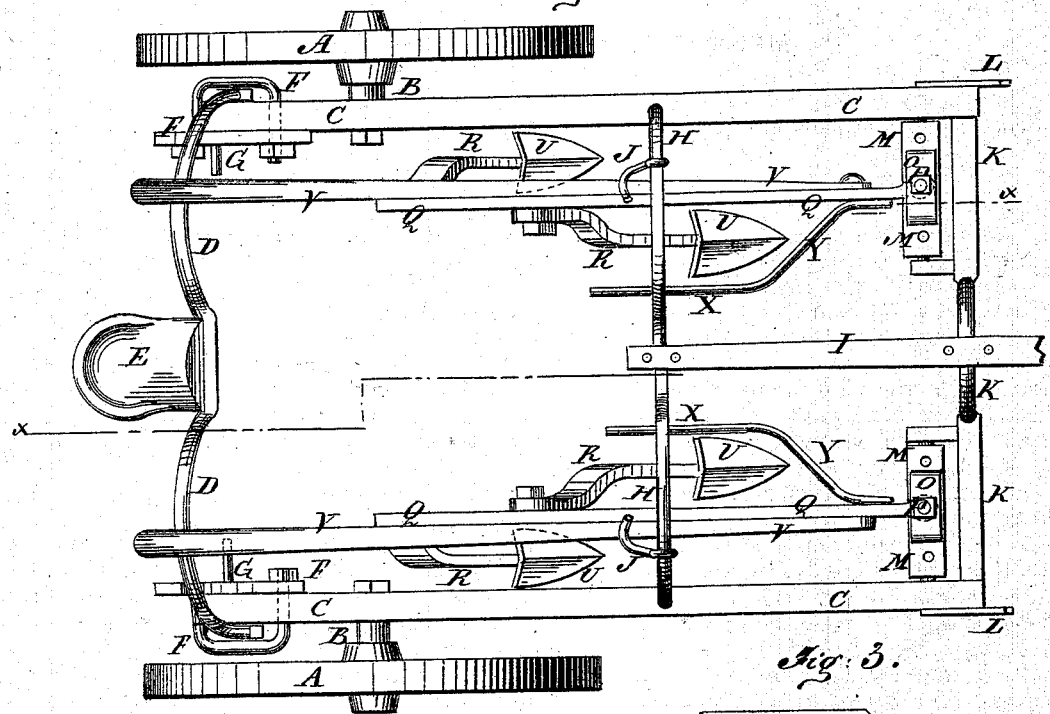
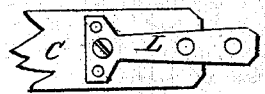
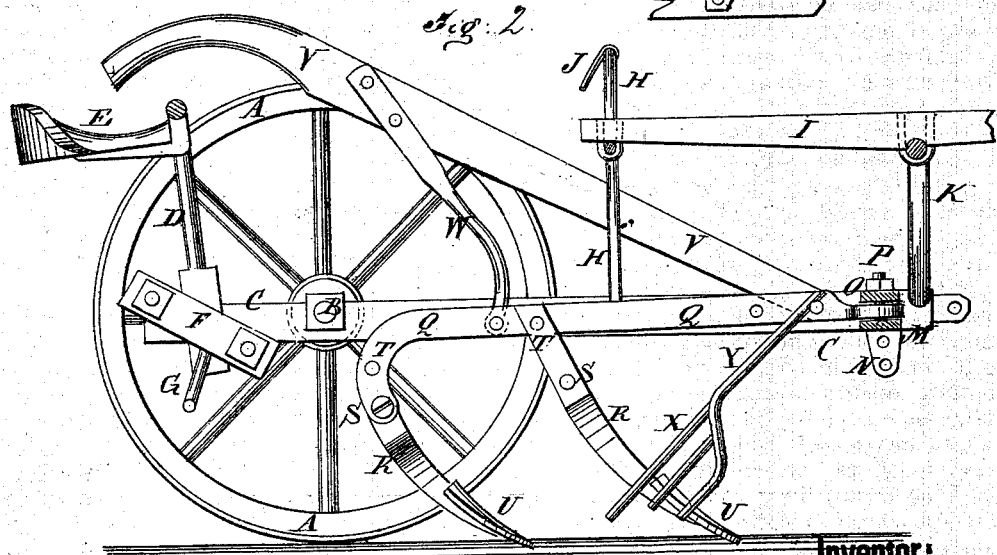

UNITED STATES PATENT OFFICE.

ISAAC CORY, OF DALTON, INDIANA.

IMPROVEMENT IN CULTIVATORS.

Specification forming part of Letters Patent No. 146,576, dated January 20, 1874; application filed September 27, 1873.

*To all whom it may concern:*

Be it known that I, ISAAC CORY, of Dalton, in the county of Wayne and State of Indiana, have invented a new and useful Improvement in Cultivator, of which the following is a specification:

Figure 1 is a top view of my improved cultivator. Fig. 2 is a detail vertical section of the same, taken through the line $x\ x$, Fig. 1. Fig. 3 is a detail view of the draft-iron.

Similar letters of reference indicate corresponding parts.

The invention will first be fully described, and then pointed out in the claims.

A are the wheels, which revolve upon the short axle-arms B, the inner ends of which pass through the side bars C, to which they are secured by nuts, as shown in Figs. 1 and 2. D is an arched bar, to the depressed middle part of which is secured the driver's seat E. The ends of the arched bar D are secured to the rear ends of the side bars C by bow and yoke clamps F, so that the arched bar D, and with it the driver's seat E, may be moved forward or back to adjust it so that the weight of the driver may properly balance the machine. G are foot-rests or stirrups for the driver's feet, which are secured to the rear ends of the side bars C by the same clamps, F, that secure the ends of the arched bar D, and may be raised or lowered, as the length of the driver's legs may require. The middle parts of the side bars C are connected by an arched bar, H, the ends of which are secured to said bars, and its middle part depressed to bring it into proper position for the rear end of the tongue I to be attached to it, the side bends giving space for the plow-handles when the plows are raised from the ground. The side bends of the bar H are provided with hooks J, to receive the plow-handles, to support the plows when raised from the ground, for convenience in turning and passing from place to place. The hooks J are designed to be made adjustable to correspond with the adjustment of said plow-handles. The forward ends of the side bars C are connected by a bar, K, the end parts of which are horizontal, and the middle part arched, as shown in Figs. 1 and 2. The tongue I is also secured to the middle part of the arch of the bar K. To the outer side of the forward end of each of the side bars C is secured a draft-iron, L, by a bolt passing through the said iron and through the said bar. In the forward end of the iron L is formed a hole for the attachment of the whiffletree, and upon its rear end is formed a cross-head, in which are formed several holes to receive a bolt or pin, which passes through the bar C, so that by removing the said pin or bolt, the said draft-iron may be adjusted according to the height of the horse, to take the downward draft from the tongue. In the rear of and parallel with the horizontal parts of the bar K are placed the bars or rollers M, the outer ends of which are pivoted to downwardly-projecting lugs N, attached to the side bars C, and their inner ends are pivoted to downwardly-projecting lugs N, formed upon or attached to the rear side of the inner ends of the horizontal parts of the bar K. The lugs N have several holes formed in them to receive the pivots of the roller M, so that the said roller can be conveniently raised and lowered to cause the plows to work deeper or shallower in the ground, as may be required. O is a keeper or short plate placed upon the upper side of the roller M, and the ends of which are bent downward to rest upon said roller. The keeper O is held down upon the roller M by a bolt, P, which passes through the said keeper and roller, and through a hole in the forward end of the plow-beam Q, so that the rear end of said beam may have a free lateral and vertical movement. R are the plow-standards, two of which are used with each beam Q. The rear standards R are secured to the downwardly-projecting rear end of the beam Q, and the forward standards are secured to a downwardly-projecting arm formed upon said beam. The standards R are secured in place by a bolt, S, and a wooden pin, T, so that should the plow strike an obstruction the said pins T may break and allow the standards to swing back upon the bolts S, thus preventing breakages. The forward standards R are made with an inward curve or offset, and the rear standards R are made with an outward curve or offset, so as to bring the plows U, attached to said standards, to a proper distance apart. The plows U may be shovels or any other suitable kind of plow. V are the handles, the forward ends of which are secured to the forward part of the beams Q by a bolt, and the rear parts of which are held in proper position by braces W. The lower ends of the braces W are bolted to the rear parts of the beams Q, and their upper ends are bolted to the handles V. Several holes are formed in the forward part of the beams Q, and in the upper part of the braces W, to receive the bolts that secure the handles V to said parts, so that the said handles may be adjusted to correspond with the adjustment of the driver's seat E. X is a slotted guard, formed upon or attached to the rear end of the rod Y, the forward end of which is secured to the forward part of the beam Q, in such a position that the guard X may stand at the inner side of the inner plows, to prevent clods or stones from being thrown by the plows against the plants.

Having thus described my invention, I claim as new and desire to secure by Letters Patent—

1. The combination, with seat-bar D and stirrups G, of the clamps F F, to hold both seat and foot-rest adjustably to the frame, in the manner described.

2. The front bar K, bowed in the center, and the middle bar H, bowed on each side, combined with the side bars C C, to allow the plows to be pivoted in front, the handles to rise up, and the implements to be moved laterally or vertically, in the manner described.

ISAAC CORY.

Witnesses:
BENJAMIN BALLS,
L. NATHAN BROWER.